United States Patent [19]

Giannuzzi

[11] Patent Number: 4,763,456
[45] Date of Patent: Aug. 16, 1988

[54] ROOF ANCHOR AND STRESS PLATE ASSEMBLY

[76] Inventor: Louis N. Giannuzzi, 59 Dingletown Rd., Greenwich, Conn. 06830

[21] Appl. No.: 81,016

[22] Filed: Aug. 3, 1987

[51] Int. Cl.⁴ .............................................. E04B 5/00
[52] U.S. Cl. ...................... 52/410; 52/512; 52/700; 411/133; 411/154; 411/426; 411/511; 411/533
[58] Field of Search ............... 52/242, 287, 288, 292, 52/293, 254, 255, 278, 405, 408, 410–412, 506, 511, 512, 698–700, 716, 717.1, 718.1; 249/93; 24/297; 411/128, 133–135, 138, 368–370, 399, 533, 545, 546, 511, 426, 154

[56] References Cited

U.S. PATENT DOCUMENTS

| | | | |
|---|---|---|---|
| 1,177,348 | 3/1916 | Miller | 411/128 |
| 1,286,862 | 12/1918 | Williams | 411/371 |
| 2,391,308 | 12/1945 | Hanneman | 411/134 |
| 2,664,809 | 1/1954 | Morell | 52/303 X |
| 3,319,510 | 5/1967 | Rapata | 411/40 |
| 3,357,064 | 12/1967 | Munse | 24/291 |
| 3,385,341 | 5/1968 | Garstkiewicz | 411/134 |
| 4,034,788 | 7/1977 | Melone | 411/134 |
| 4,074,501 | 2/1978 | Sandqvist | 52/741 |
| 4,288,951 | 9/1981 | Carlson et al. | 52/94 |
| 4,543,763 | 10/1985 | Ernst et al. | 52/698 |
| 4,574,551 | 3/1986 | Giannuzzi | 52/512 |
| 4,641,472 | 2/1987 | Young et al. | 52/361 |
| 4,642,012 | 2/1987 | Blucher et al. | 411/371 |
| 4,726,164 | 2/1988 | Reinwall et al. | 52/410 |

FOREIGN PATENT DOCUMENTS

| | | | |
|---|---|---|---|
| 2574697 | 6/1986 | France | 249/93 |
| 7415863 | 6/1976 | Netherlands | 411/545 |
| 2645 | of 1903 | United Kingdom | 411/128 |
| 321922 | 11/1929 | United Kingdom | 411/133 |
| 2149041A | 6/1985 | United Kingdom | 411/134 |

Primary Examiner—John E. Murtagh
Assistant Examiner—Andrew Joseph Rudy
Attorney, Agent, or Firm—Michael Ebert

[57] ABSTRACT

An anchor and stress plate assembly adapted to secure an insulation layer to the deck of a roof without penetrating the lower surface of the deck which is formed either of relatively soft or hard decking material. The anchor is provided with a flanged head and a shank whose leading section takes the form of an auger screw having a root which tapers toward the tip and a threading about the root whose crests are of approximately uniform diameter. When the anchor is turned into soft decking material, the tapered root of the auger screw then acts to pack this material into a dense mass in the region surrounding the screw to enhance the holding power of the anchor. In hard decking material, a hole must first be drilled therein to receive the auger screw whose root when the anchor is turned in fits within the hole and whose crests then cut a thread in the hole wall to securely retain the anchor. The stress plate which overlies the insulation layer to prevent uplift thereof has a central depression surrounding an opening defined by a circular series of ratchet teeth. When the anchor is fully turned into the decking material, its head then lies within the plate opening while the flange rests within the depression. The anchor head is provided with a pawl that is deflected by the ratchet teeth when the anchor is being turned in, the pawl engaging the teeth when the anchor seeks to turn out, thereby preventing loosening of the installed assembly.

12 Claims, 2 Drawing Sheets

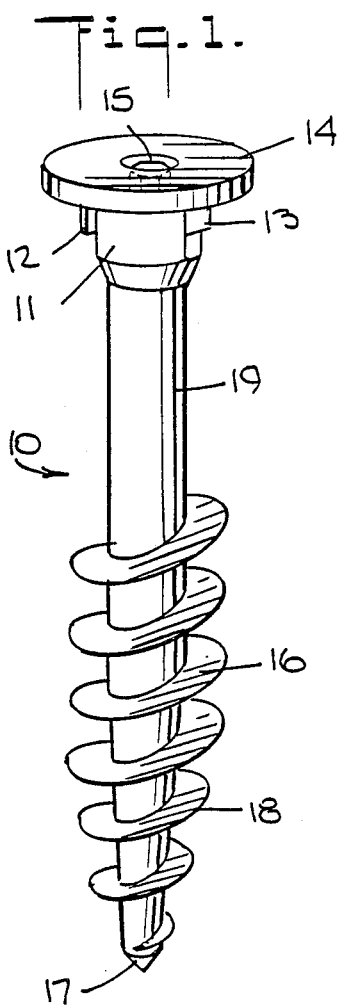
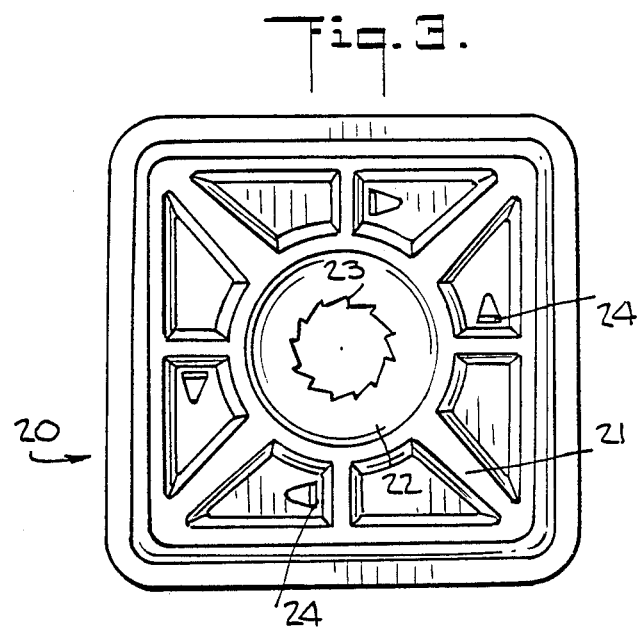
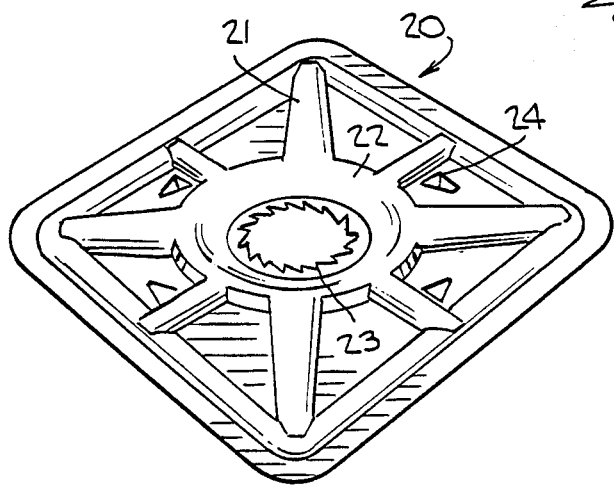
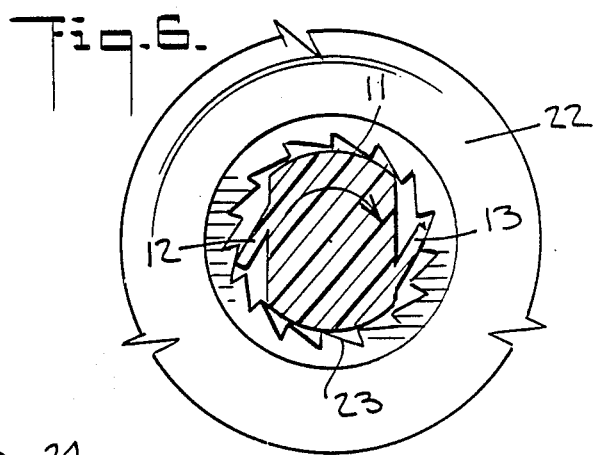
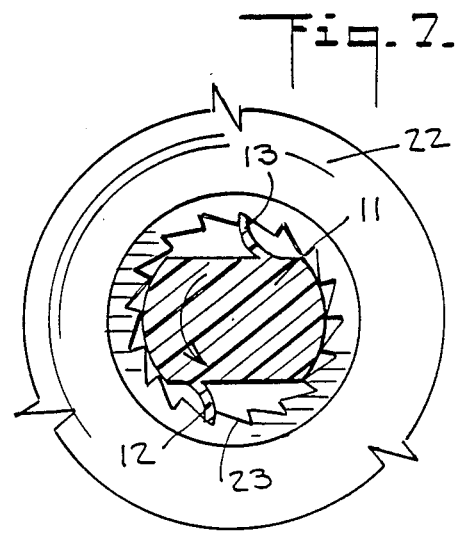

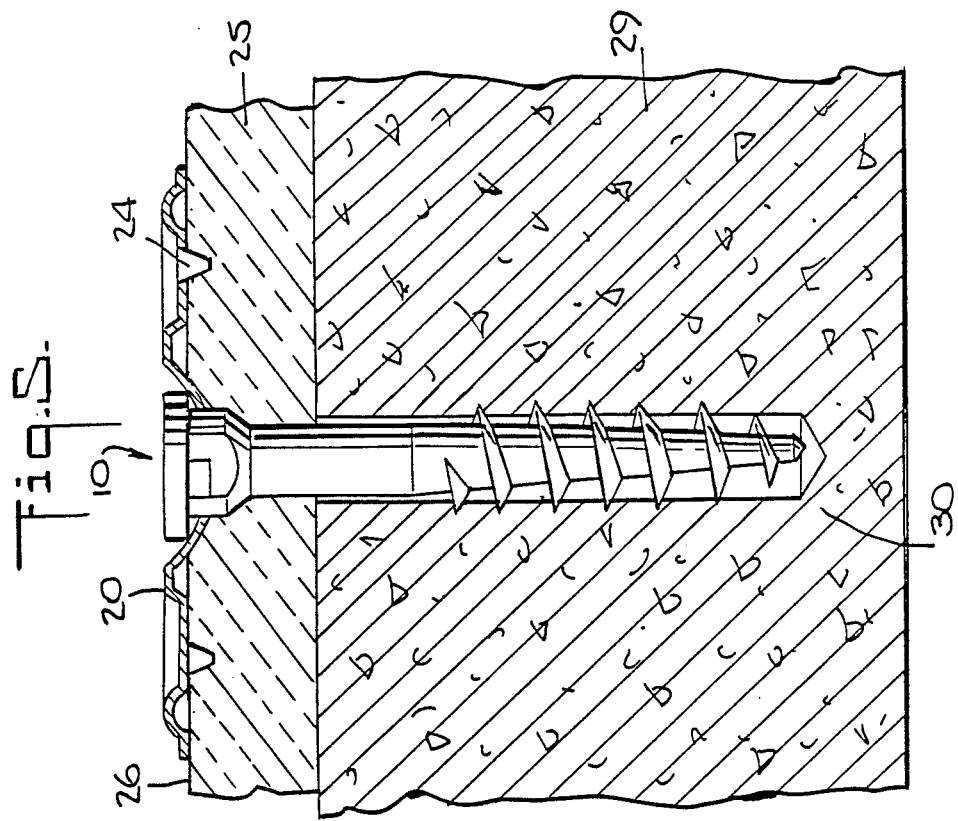
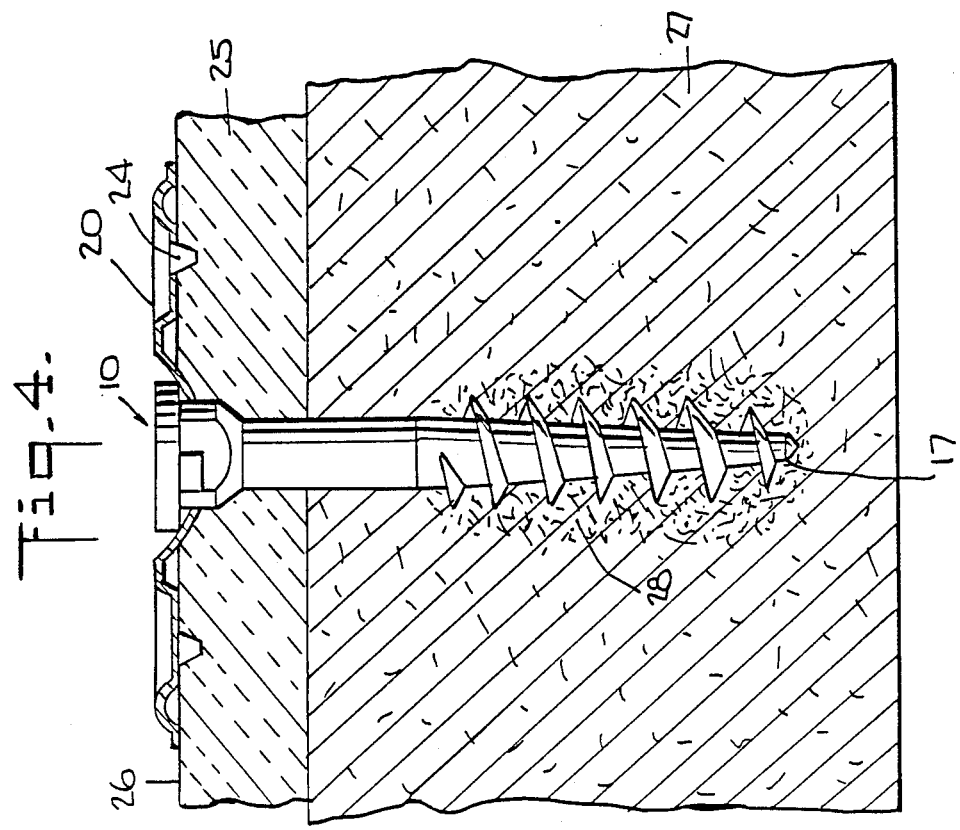

ROOF ANCHOR AND STRESS PLATE ASSEMBLY

BACKGROUND OF INVENTION

1. Field of Invention:

This invention relates generally to an anchor and stress plate assembly for securing an insulation layer to the deck of a roof, and more particularly to an assembly of this type whose anchor turns into decking material but does not penetrate the underface thereof.

2. Status of Prior Art:

It is common practice to cover the roof of a building with a layer of thermal insulation formed of pads or panels of lightweight material such as fiberglass or rigid foam plastic. These panels are laid down on the roof deck and covered by a sheet of polyvinyl chloride, or other water-impermeable membrane to protect the layer against water penetration.

Since the roof is exposed to the elements, it may on occasion be subject to high velocity winds as high as 150 miles per hour. Unless the insulation layer is firmly secured in place, the resultant updraft may blow the layer off the roof. For various reasons such as fire protection, the use of bonding agents to adhere the insulation layer to the deck of the roof is being discontinued, and instead mechanical fasteners are now employed to retain the layer when a strong updraft is encountered. The present practice of securing the insulation layer to the roof deck is by means of load-bearing plates of sheet metal which overlie the insulation layer and are bolted or otherwise mechanically fastened to the deck.

Among the patents which disclose load-bearing or stress plates for this purpose are the Giannuzzi patent 4,574,551, the Williams patent 1,286,862, the Sandquist patent 4,074,501 and the Carlson patent 4,288,951.

The concern of the present invention is with an anchor and stress plate assembly usable with two types of decking material. One is relatively soft, such as a porous wood and fiber composite known commercially as Tectum. The other is a hard decking material such as gypsum, plaster board, or low strength cement. By "a hard decking material" is meant one which when a hole is drilled therein is capable of being tapped by an auger screw. It is important to note that such hard deck materials are also somewhat brittle and therefore subject to disintegration by an anchor screw unless the screw is of the proper type.

Conventional anchor and stress plate assemblies for these two types of decking materials usually make use of anchors of the toggle type which penetrate the material. Hence when the assembly is installed, the stress plate then engages the upper face of the insulation layer while the toggle then engages the underside of the deck. A serious practical shortcoming of this conventional arrangement is that the toggles are exposed at the underside of the deck and deprive the underside of a clean, finished appearance. When the deck underside forms the ceiling of the building interior, the presence of toggles on this ceiling is unsightly and therefore not commercially acceptable.

Another drawback is that anchors in the form of conventional toggle bolts tend to loosen up as a result of vibratory or other forces, and sometimes in doing so cause debris to fall into the interior of the building. And in loosening up, the anchor may in time fail and result in a blow off of the insulation layer held thereby.

In order to provide an assembly including a nonpenetrating anchor for soft decking materials such as Tectum, the Blucher et al. patent No. 4,642,012 provides an auger-like anchor whose shank is composed of three sections of different diameter, the head of the screw being received in a washer functioning as a stress plate. No means are provided in this assembly to resist loosening of the anchor.

SUMMARY OF INVENTION

In view of the foregoing, the main object of this invention is to provide an improved roof anchor and stress plate assembly of the non-penetrating type for securing a layer of insulation to a deck composed of relatively soft or hard material.

More particularly, an object of this invention is to provide an assembly of the above type in which the anchor, when the assembly is installed, is highly resistant to any force which seeks to turn out the anchor, thereby preventing loosening of the installed assembly.

Also an object of this invention is to provide an assembly whose anchor shank has an auger screw section that functions effectively in both soft and dense decking material.

A significant feature of an anchor in accordance with the invention is that when the auger screw section thereof is turned into soft, relatively low density decking material, this action causes the material to pack into a mass of increased density in the region surrounding the screw, thereby enhancing its holding power; the same auger screw when turned into a hole drilled in hard decking material allowing for easy cutting of a thread in the wall of this hole but with a minimum of crushing or pulverizing of the hard and relatively brittle material.

Yet another object of the invention is to provide an assembly of the above type which may be mass-produced at low cost, and which may be installed without difficulty by a simple torque-producing tool.

Briefly stated, these objects are attained in an anchor and stress plate assembly adapted to secure an insulation layer to the deck of a roof without penetrating the lower surface of the deck which is formed either of relatively soft or hard decking material. The anchor is provided with a flanged head and a shank whose leading section takes the form of an auger screw having a root which tapers toward the tip and a threading about the root whose crests are of approximately uniform diameter. When the anchor is turned into soft decking material, the tapered root of the auger screw then acts to pack this material into a dense mass in the region surrounding the screw to enhance the holding power of the anchor. In hard decking material, a hole must first be drilled therein to receive the auger screw whose root when the anchor is turned in fits within the hole and whose crests then cut a thread in the hole wall to securely retain the anchor.

The stress plate which overlies the insulation layer to prevent uplift thereof has a central depression surrounding an opening defined by a circular series of ratchet teeth. When the anchor is fully turned into the decking material, its head then lies within the plate opening while the flange rests within the depression. The anchor head is provided with a pawl that is deflected by the ratchet teeth when the anchor is being turned in, the pawl engaging the teeth when the anchor seeks to turn out, thereby preventing loosening of the installed assembly.

BRIEF DESCRIPTION OF DRAWINGS

For a better understanding of the invention as well as other objects and further features thereof, reference is made to the following detailed description to be read in conjunction with the accompanying drawings, wherein:

FIG. 1 is a perspective view of the anchor included in an assembly in accordance with the invention;

FIG. 2 is a perspective view as seen from the top face of the stress plate included in the assembly;

FIG. 3 is a plan view of the rear face of the stress plate;

FIG. 4 is a section taken through a layer of insulation secured to a deck of soft decking material in which the assembly is installed;

FIG. 5 is a similar sectional view in which the assembly is installed in hard decking material having a hole drilled therein;

FIG. 6 is a transverse section taken through the assembly to illustrate the relationship existing between the anchor head pawls and the ratchet teeth which define the opening in the stress plate when the anchor is being turned in; and FIG. 7 is similar to FIG. 6, but shows the relationship that arises when the anchor seeks to turn out.

DESCRIPTION OF INVENTION

Referring now to FIG. 1, there is shown an anchor 10 included in a roof anchor and stress plate assembly according to the invention, anchor 10 being molded or otherwise fabricated of a synthetic plastic material of high strength such as glassreinforced nylon or cast of a corrosion resistant zinc alloy or other suitable metal.

Anchor 10 includes a generally-cylindrical head 11 having at diametrically-opposed positions thereon flattened sides and a pair of fingers or pawls 12 and 13 which cantilevers over the respective flattened sides in opposing angular directions. Mounted on head 11 and integral therewith is a circular flange 14 whose diameter is greater than that of the head.

An axial bore extending through flange 14 and head 11 is provided with a hexagonally-shaped inner wall to define a socket 15 for receiving a similarly-shaped bit of a torque-producing tool for turning the anchor. In practice, instead of a socket, the anchor flange may be provided with a slot or slots to receive the blade of a screw driver, such as a Phillips screw driver.

Anchor 10 includes a cylindrical shank whose leading section takes the form of an auger screw having a root 16 which tapers toward the tip 17. Spiralled about root 16 is a threading 18 whose crests are of approximately uniform diameter throughout the length of the leading section except for the crest adjacent tip 17. This crest is of smaller diameter to facilitate entry of the auger screw into the decking material. The trailing section 19 of the shank has a length appropriate to the thickness of the insulation layer to be secured to the deck. Trailing section 19 is of uniform diameter and is unthreaded.

Stress plate 20, as shown in FIGS. 2 and 3, is preferably formed of rust-resistant sheet metal. The plate has a square form and rounded corners, the stress plate being embossed to create a reinforcing pattern of radial spokes 21 in a manner similar to that disclosed in the Giannuzzi patent No. 4,574,551.

Plate 20 is provided with a circular depression 22 which surrounds a central opening defined by a circular series of ratchet teeth 23. Struck out of the plate at different positions thereon are four pointed lugs 24 which project below the plate and cut into the insulating layer when plate 20 is secured thereto by the anchor. These lugs act to resist rotation of the fully installed plate.

FIG. 4 shows the installed assembly when it serves to secure a layer of insulation 25 to the surface of a deck 27 formed of soft decking material, such as Tectum. In installing the assembly, stress plate 20 is placed over insulation layer 25 and anchor 10 is then pushed through this readily penetrable insulation layer until the tip 17 of the anchor impinges on the surface of the decking material. At this point, it becomes necessary to turn the auger screw section of the anchor into the decking material.

When the anchor is fully turned in, its head 13 then lies within the opening in stress plate 20, with the flange 14 then resting on the depression 22 so that the flange is flush with the anchor plate and does not protrude thereabove. The length of the anchor is such that when it is fully turned in, tip 17 thereof is above the undersurface of the decking material and does not penetrate this material; hence the appearance of the undersurface is clean and unaffected by the installation.

When turning the auger screw into deck 27, the soft decking material thereof which is usually a wood-fiber composite of relatively low density, is then packed by the threading of the screw into a dense mass 28 which surrounds the screw and acts to improve resistance to withdrawal of the anchor.

Such packing results from the geometric relationship of the tapered root 16 of the auger screw section to the crests of the threading which are of approximately uniform diameter. As the screw advances, the decking material in the region surrounding the relatively small diameter root at the lower end portion of the auger screw is progressively compressed. This progressive compression gives rise to an increased density in the decking material while keeping to a minimum the rupturing of the fibrous elements thereof and thereby maintaining the integrity of the material. The densified mass of soft decking material in the region surrounding the auger screw results in a significant increase in holding strength. This advantage is lacking in an ordinary auger screw.

As shown in FIG. 6, when head 11 of the anchor lies within the opening in the stress plate 20 and the anchor is being turned in clockwise, then pawls 12 and 13 which project from opposite sides of head 11 are deflected by the ratchet teeth 23 which surround the opening; hence the pawls do not resist a turning-in action.

But when, as shown in FIG. 7, vibratory or other forces seek to turn the anchor out counterclockwise, then pawls 12 and 13 are engaged by the ratchet teeth of the stress plate. Because stress plate 20 is prevented by its lugs 24 from rotating, the anchor is then not permitted to turn counterclockwise and the installation is prevented from loosening.

The installation illustrated in FIG. 5 differs from that in FIG. 4, for now the decking material 29 is relatively hard and brittle, not soft. In order to turn anchor 10 into this hard material, one must first drill a hole 30 therein. The diameter of hole 30 is about the same as or is slightly greater than that of the trailing section 19 of the anchor and is therefore smaller than the approximately uniform diameter of threading crest 18.

Hence when the auger screw of anchor 10 is turned into drilled hole 30, the root fits in a hole, whereas the crests of the screw then proceed to cut a thread in the hard decking material while keeping to a minimum the pulverizing or crushing of this brittle material. Here again the anchor, when fully turned in, does not go through the decking material, yet it is strongly anchored therein to resist withdrawal even when subjected to very heavy pull out forces of the type encountered in roof installations.

It is to be understood that an anchor in accordance with the invention has practical applications apart from those specifically disclosed herein. The anchor need not be used in conjunction with a stress plate of the type illustrated, but may be used with other types of stress plates or without a stress or load bearing plate, for the anchor can be used to advantage in either a soft or hard decking or other material. And while the anchor and stress plate assembly has been described as applicable to roof installations, it is also applicable to other installations. Thus the assembly is usable to secure panels of various types to side walls or other structural members.

While there has been shown and described a preferred embodiment of a roof anchor and stress plate assembly in accordance with the invention, it will be appreciated that many changes and modifications may be made therein without, however, departing from the essential spirit thereof. Thus instead of a sheet metal stress plate, the plate may be made of plastic material of high strength.

I claim:

1. An anchor and bearing plate assembly adapted to secure a layer of insulation or other relatively lightweight, non-metallic material to a deck of a roof or other substrate having an undersurface without fully penetrating the deck which is formed either of relatively soft or hard decking material, said layer and said deck having a combined thickness, said assembly comprising:
   (a) an anchor whose length is shorter than the combined thickness of the layer and the deck, the anchor being provided with a head of a predetermined cross-sectional area having at least one pawl projecting therefrom and a shank whose leading section is constituted by an auger screw terminating in a tip; and
   (b) a generally planar bearing plate of a substantially greater cross-sectional area having a central opening to receive the shank of the anchor and provided with a series of ratchet teeth in cooperative relation to said pawl, and lugs projecting below the plate, whereby when the plate is placed over said layer and the anchor is fully turned into the decking material, the tip of the auger screw is then above the undersurface of the deck while the head thereof then lies on the plate to force the lugs to penetrate the layer to prevent rotation of the plate, the pawl then engaging the ratchet teeth of the plate to resist turning out of the anchor and loosening of the assembly.

2. An assembly as set forth in claim 1, wherein said plate is provided with a depression which surrounds the opening, and said anchor head has a flange mounted thereon which rests within said depression when the head lies on the plate.

3. An assembly as set forth in claim 2, wherein said flange and said head have a bore therein forming a socket for receiving a torque-producing tool.

4. An assembly as set forth in claim 1, wherein said plate is formed of sheet metal or synthetic plastic material.

5. An assembly as set forth in claim 4, wherein the lugs on said plate are constituted by pointed barbs projecting therebelow which cut into said layer to prevent rotation of the plate.

6. An assembly as set forth in claim 1, wherein said auger screw has a root which tapers toward the tip thereof along substantially the full length of the leading section and a threading whose crests are of approximately uniform diameter along substantially the full length of the leading section except the portion thereof adjacent the tip.

7. An assembly as set forth in claim 6, wherein the geometric relationship of the root to the threading is such that when the screw is turned into said soft decking material, the material is caused to pack to produce a dense mass in the region surrounding a screw to resist withdrawal of the anchor.

8. An assembly as set forth in claim 6, wherein the geometric relationship of the root to the threading is such that when the screw is turned into a hole drilled in said hard decking material, the roots fits in the hole and the crests of the threading cut a thread in the wall of the hole.

9. An assembly as set forth in claim 8, wherein said anchor has an unthreaded trailing section whose diameter is about equal to that of the drilled hole, and the diameter of the crests is greater than that of the hole.

10. An assembly as set forth in claim 1, wherein the anchor is fabricated of synthetic plastic material.

11. An anchor and bearing plate assembly adapted to secure a layer of insulation or other relatively lightweight, non-metallic material to the deck of a roof or other substrate having an undersurface without fully penetrating the deck which is formed either of relatively soft or hard decking material, said layer and said deck having a predetermined combined thickness, said assembly comprising:
   (a) an anchor whose length is shorter than the combined thickness of the layer and the deck, the anchor having a member of predetermined cross-sectional area adapted to receive a torque-producing tool and provided with at least one finger, and a shank projecting from the member whose leading section is constituted by a screw terminating in a tip;
   (b) a generally planar bearing plate of substantially greater cross-sectional area having an opening to receive the shank of the anchor, said plate being provided with ratchet teeth in cooperative relation to said finger whereby when the plate is placed over said layer and the anchor is fully turned into the decking material, the tip of the screw is then above the undersurface of the deck, the member when the anchor is turned in then approaches the plate and the finger then engages the ratchet teeth of the plate to resist turning out of the anchor and loosening of the assembly, said plate having lugs projecting from its undersurface which when the member approaches the plate are forced to penetrate said layer, thereby preventing rotation of the plate.

12. An anchor and bearing plate assembly adapted to secure a layer of insulation or other material to the deck of a roof or other substrate which is formed either of relatively soft or hard decking material, said assembly comprising:
  (a) an anchor having a member adapted to receive a torque-producing tool and provided with at least one finger, and a shank projecting from the member whose leading section is constituted by a screw terminating in a tip;
  (b) a bearing plate having an opening to receive the shank of the anchor, said plate being provided with ratchet teeth in cooperative relation to said finger whereby when the plate is placed over said layer and the anchor is turned into the decking material, the member then approaches the plate and the finger then engages the ratchet teeth of the plate to resist turning out of the anchor and loosening of the assembly, said plate having lugs projecting from its undersurface which when the member approaches the plate, the lugs are forced to penetrate the layer to prevent rotation of the plate.

* * * * *